United States Patent [19]
Fayt et al.

[11] Patent Number: 5,554,696
[45] Date of Patent: Sep. 10, 1996

[54] PROCESS FOR THE PREPARATION OF INDUSTRIALLY APPLICABLE DIFUNCTIONAL ANIONIC POLYMERIZATION INITIATORS AND THEIR USE

[75] Inventors: Roger M. A. Fayt, Liege, Belgium; Frederik H. van der Steen, Amsterdam, Netherlands; Phillippe J. Teyssie, Liege, Belgium; Judith J. B. Walhof, Amsterdam, Netherlands; Yi-Song Yu, Liege, Belgium

[73] Assignee: Shell Oil Company, Houston, Tex.

[21] Appl. No.: 437,738

[22] Filed: May 9, 1995

[30] Foreign Application Priority Data

Sep. 5, 1994 [EP] European Pat. Off. .............. 94201287

[51] Int. Cl.⁶ .............................. C08F 297/04; C07F 1/02
[52] U.S. Cl. ..................... 525/314; 525/271; 526/180; 526/340; 526/347; 502/157; 260/665 R
[58] Field of Search ..................... 525/314, 271; 526/180, 340, 347; 502/157; 260/665 R

[56] References Cited

U.S. PATENT DOCUMENTS

| | | | |
|---|---|---|---|
| 3,903,168 | 2/1975 | Foss et al. | 260/583 R |
| 4,822,530 | 4/1989 | Bronstart et al. | 260/665 R |
| 5,393,843 | 2/1995 | Handlin et al. | 525/332.8 |
| 5,462,994 | 10/1995 | Lo et al. | 525/314 |
| 5,464,914 | 11/1995 | Lo et al. | 526/180 |

*Primary Examiner*—Joseph L. Schofer
*Assistant Examiner*—I. Zemel

[57] ABSTRACT

Process for the preparation of an efficient industrial α, ω-dilithio poly(conjugated diene) diinitiator having a peak molecular weight in the range of from 1000 to 3000, comprising the reaction of mono-organolithium initiator with diisopropenyl benzene in an apolar hydrocarbon solvent, optionally in the presence of a tertiary amine, followed by addition to the reaction mixture of a small amount of conjugated diene monomer and at least 15 vol % of an aromatic ether activator at a temperature in the range of from 0° to 30° C.; the use of said α, ω-dithio initiator for the manufacture of symmetrical block copolymers by anionic polymerization, from monovinylaromatic, conjugated diene and/or polar vinyl compound monomers; and block copolymers so obtained having a combination of a narrow molecular weight distribution (Mw/Mn≦1.20) and relatively low vinyl content (≦18%).

15 Claims, No Drawings

PROCESS FOR THE PREPARATION OF INDUSTRIALLY APPLICABLE DIFUNCTIONAL ANIONIC POLYMERIZATION INITIATORS AND THEIR USE

FIELD OF THE INVENTION

The present invention relates to a process for the preparation of industrially applicable difunctional anionic polymerization initiators and their use for the manufacture of block copolymers derived from at least a conjugated diene and a monovinylaromatic monomer. More in particular the present invention relates to a process for the preparation of α, ω-dilithiopolydienes, which can be used for the industrial anionic polymerization of monomers into substantially symmetrical block copolymers.

BACKGROUND OF THE INVENTION

Symmetrical block copolymers of the type ABA or CABAC, wherein B represents a predominantly poly(conjugated diene)block, A represents predominantly poly(monovinylaromatic) blocks, and C represents predominantly poly(polar vinyl monomer)blocks, have shown a growing commercial interest, while on the other hand the requirements to be met by such block copolymers with reference to their specified standard properties have become more and more stringent.

The preparation of dilithium organo compounds for the anionic polymerization of monovinylaromatic and/or conjugated diene monomers into block copolymers was known in principle from e.g. U.S. Pat. Nos. 3,652,516; 3,734,973; 3,663,634; 3,694,516; 3,668,263; 3,903,168; 3,954,894; 4,039,593; 4,172,100; 4,182,818; 4,960,842; European patent applications Nos. 0316857 and 4132294 and from Macromolecules 5, 453–8 (1969); R. P. Foss et al, Macromolecules 12, 344–6 (1979); C. W. Kamienski et al, Curr. Appl. Sci. Med. Technol. 315–25 (1985); R. P. Foss et al, Macromolecules 10, 287–291 (1977); R. P. Foss et al, Macromolecules 12, 1210–1216 (1979); Polymer 23, 1953–9 (1982); T. E. Long et al, J. Polym. Sci. Part A, Polym. Chem. vol. 27, 4001–4012 (1989).

In particular from the U.S. Pat. No. 3,663,634 the preparation of hydrocarbon soluble organodilithium polymerization initiators was known. Said preparation comprised intimately contacting lithium metal with at least one compound selected from the group consisting of polyaryl substituted ethylenes, hydrocarbon substituted and unsubstituted conjugated diolefins and vinyl substituted aromatic compounds containing only carbon and hydrogen atoms, in a solvent mixture comprising:

(A) at least one solvent member selected from the group consisting of aliphatic, cycloaliphatic and aromatic hydrocarbons, and (B) at least one solvent member selected from a group of aromatic ethers, aromatic thioethers and tertiary amines, and wherein the volume fraction of solvent component (A) in the mixture can range from 57.0 vol % to 92.0 vol % and wherein the volume fraction of solvent component (B) in the solvent mixture can range from 8.0 to 43.0 vol %.

As component (B) preferably anisole was proposed and as the polyaryl-substituted ethylene 1,1-diphenylethylene was proposed.

The preferred amount of anisole in the solvent mixture was indicated to be about 15 vol % in combination with 85 vol % benzene.

From U.S. Pat. No. 3,694,516 was known a method for the preparation of a solvated lithium metal adduct of at least one member selected from the group consisting of (a) conjugated polyene hydrocarbon monomers and in particular 1,3-butadiene or isoprene, (b) vinyl substituted aromatic hydrocarbon monomers and in particular styrene, (c) mixtures of (a) and (b), and (d) their slightly chain-extended oligomers, which comprised providing a solution, in an organic solvent which includes at least one member selected from volatile liquid inert strongly solvating dialkyl ethers, cyclic ethers and tertiary amines, of at least one di- or poly-lithio adduct selected from the aforesaid (a), (b), (c) and (d) groups, admixing said solution with at least one member selected from the group consisting of weakly solvating liquid ethers (e.g. anisole) and weakly solvating liquid tertiary amines, said weakly solvating compounds having a boiling point substantially higher than the boiling point of said strongly solvating compound, and evaporating from said mixture substantially all of said strongly solvating compound without substantial evaporation of said weakly solvating compound.

The preferred liquid hydrocarbon solvent was benzene.

In U.S. Pat. No. 4,196,154 multifunctional lithium containing initiators were lateron disclosed, which were soluble in hydrocarbon solvents and thus highly useful in the preparation of block copolymers aimed at.

Additional teachings regarding the use of multifunctional lithium based initiators could be found in e.g. U.S. Pat. Nos. 4,201,729; 4,200,718; 4,205,016; 4,172,190 and 4,196,153. However, the disadvantage connected with the use of multifunctional lithium containing initiators, providing polymers having rather wide molecular weight distributions (about 1.1 or greater), still remained.

Additional techniques were proposed, such as the use of coinitiators such as lithium alkoxides or specific triamines such as pentamethyldiethylene triamine or combinations thereof were proposed to obtain butadiene containing block copolymers having molecular weight distributions down to 1.06. Similar polymers containing primarily isoprene did not become available at all, because isoprene appeared to be less easily polymerizable by anionic techniques compared to butadiene and even rapid polymer addition did not occur.

It has been generally appreciated by persons skilled in the art, that block copolymers of improved tensile strength are obtained if the block copolymer has a reduced molecular weight distribution. In particular, a triblock polymer of the formula styrene/isoprene/styrene prepared by conventional coupling of monofunctional lithium initiated diblock copolymers was found to demonstrate significantly improved tensile strength for equivalent number average molecular weight polymers, if the molecular weight distribution (Mw/Mn) is 1.03 instead of 1.20, L. C. Case, Makromol. Chem, V. 37, p 243 (1960).

Therefore there is still a need for block copolymers of monovinylaromatic monomer and conjugated diene, having the presently required physical properties and hence a related appropriate molecular weight distribution.

According to the disclosure of the European patent application No. 0316.857 it was tried to produce the block copolymers aimed at by means of a process, using a very specific diinitiator organo-lithium compound and a specific organic diamine or triamine. Especially against the use of such amines on an industrial scale, objections arose with reference to environmental and health safety aspects.

From the European patent: application No. 0413.294 it was known to produce narrow molecular weight distribution block copolymers (Mw/Mn in the range from 1.027 to 1.058) of the formula:

B-B'-X-(B'-B); or

A-B-B'-X-(-B'BA)

wherein A was a block of a non elastomeric monomer, B is a block of isoprene, B' is a block of butadiene and X is the remnant of a hydrocarbon soluble difunctional lithium initiator, said block copolymer having a molecular weight distribution (Mw/Mn) of less than 1.06.

As difunctional lithium based initiator were specified 1,3- or 1,4-phenylene bis(3-methyl-1-phenylpentylidene) bislithium or 1,3- or 1,4-phenylene bis(3-methyl-1-(4-methyl)phenylpentyliydene) bislithium.

Moreover the polymerization was conducted in the presence of an aliphatic triamine.

Although the use of dilithio initiators for the preparation of symmetrical block copolymers having an appropriate narrow molecular weight distribution had been disclosed in principle for a long time, up to now no actual commercial polymerization process has been carried out with the use of said initiators, due to an inevitably occurring too high vinyl content in the poly(conjugated diene) blocks caused by the copresence of a polar compound such as amines or ethers.

It will be appreciated that symmetrical block copolymers aimed at, can in principle be manufactured by coupling of living initially prepared intermediate block copolymers with a multifunctional and in particular difunctional coupling agent. However a disadvantage of such coupling process was formed by the presence in the final block copolymer of a usually difficultly controllable amount of diblock copolymer, formed from the intermediate living polymer.

Another alternative preparation route of such symmetrical block copolymers comprises the fully sequential polymerization by using a monofunctional organolithium initiator optionally in combination with a second initiation to provide a predetermined controlled amount of diblock copolymer. However, a problem of said full sequential polymerization process is caused by a relatively broad molecular weight distribution of the block segment, due to a relatively difficult initiation of the last monomer charge.

It will be appreciated that an industrial process for the preparation of symmetrical block copolymers, and in particular symmetrical triblock copolymers, which show an acceptable molecular weight distribution in combination with a relatively low vinyl content in the poly(conjugated diene) blocks due to 1,2 or 3,4 polymerization, which could meet the requirements of modern end uses of said block copolymers, by the use of a difunctional organolithium initiator, may provide significant advantages such as shorter polymerization times.

An object of the present invention was therefore to provide a suitable difunctional organolithium initiator. Additional objects of the present invention was to provide an attractive industrial process for the preparation of symmetrical block copolymers as specified hereinbefore and to provide a process for the preparation of such initiators.

SUMMARY OF THE INVENTION

As a result of extensive research and experimentation such a difunctional organolithium initiator aimed at was surprisingly found. Accordingly one aspect of the present invention is relating to a process for the preparation of an efficient industrial organolithium diinitiator, comprising the reaction of two equivalents mono-organolithium initiator with 1,3-diisoprope-nylbenzene at a temperature in the range of from −20° to 60° C. in an apolar hydrocarbon solvent and optionally in the presence of a tertiary amine, followed by addition to the reaction mixture of a small amount of conjugated diene monomer and at least 15 vol % of an aromatic ether activator relative to the total solvent volume, at a temperature in the range of from 0° to 30° C., to form a solution of an $\alpha,\omega$-dilithio poly(conjugated diene) having a peak molecular weight in the range of from 1000 to 3000.

DETAILED DESCRIPTION OF THE INVENTION

The present invention includes a process for the preparation of an efficient industrial organolithium diinitiator, comprising the reaction of two equivalents mono-organolithium initiator, with 1,3-diisoprope-nylbenzene at a temperature in the range of from −20° to 60° C. in an apolar hydrocarbon solvent and optionally in the presence of a tertiary amine, followed by addition to the reaction mixture of a small amount of conjugated diene monomer and at least 15 vol % of an aromatic ether activator relative to the total solvent volume, at a temperature in the range of from 0° to 30° C., to form a solution of an $\alpha, \omega$-dilithio poly(conjugated diene) having a peak molecular weight in the range of from 1000 to 3000.

As mono-organolithium initiator is preferably used sec.-butyllithium or tert.-butyllithium, the former of which is most preferred.

The reaction temperature during the reaction of 1,3-diisopropenylbenzene with the monoorganolithium initiator is preferably in the range of from −10° to 50° C. and more preferably in the range of from 10° to 30° C.

The apolar hydrocarbon solvent was found to be preferably selected from cycloalkanes, having from 5 to 8 carbon atoms and more preferably having 5 or 6 carbon atoms.

Also mixtures of such cycloalkanes or mixtures of predominant amounts of such cycloalkanes and minor amounts of aliphatic hydrocarbons having from 5 to 8 carbon atoms can be used, but the use of pure cyclohexane or cyclopentane was found to be most preferred.

Aromatic ether activators, which may suitably be used for the hereinbefore specified process, may be selected from anisole, diphenylether and/or derivatives thereof wherein at least one phenyl ring has been substituted by one or more lower alkyl groups or alkoxy groups, containing from 1 to 3 carbon atoms and preferably from 1 to 2 carbon atoms.

The amount of said aromatic ether activator to be applied in the reaction medium is at least 15 vol % and in particular in the range of from 15 to 40 vol %. More preferably amounts of aromatic ether activator in the range of from 15 to 25 vol % are used.

The optionally used tertiary amine is applied if any, in a molar ratio range relative to butyllithium of from 0.1 to 10 and preferably from 0.5 to 2.

The conjugated diene monomer to be added in small amounts to the reaction medium can be selected from butadiene, isoprene 2-ethyl-1,3-butadiene, 2,3-dimethyl-1, 3-butadiene and 1,3-pentadiene or mixtures thereof.

As conjugated diene is preferably used the same conjugated diene as those which constitute lateron the poly(conjugated diene) block(s) in the final block copolymer.

The peak molecular weight of the prepared α, ω-dilithio initiator is preferably in the range of from 1000 to 2800 and more preferably from 1500 to 2300.

Said peak molecular weight is determined by gel permeation chromatography using polystyrene standard calibration polymers.

It was surprisingly found that stable, hydrocarbon solvent soluble α, ω-dilithio initiators could be obtained by addition of a small amount of a conjugated diene monomer and an amount of aromatic ether activator which appeared to influence the stereochemistry of the diene polymerization in an acceptable minimal degree during the subsequent use of the initiator for the preparation of the final block copolymer (vinyl content was found to be at most 18%).

It will be appreciated that another aspect of the present invention is formed by the reaction product solutions, comprising the stable α, ω-dilithio initiator dissolved in the hydrocarbon solvent-aromatic ether activator medium, as such or optionally diluted with the hereinbefore specified hydrocarbon solvent(s) to achieve the desired concentration of the α, ω-dilithio initiator prepared, to which have been optionally added one or more of the monomers to be incorporated into the finally desired block copolymers.

A further aspect of the present invention is formed by a process for the preparation of symmetrical block copolymers derived from monovinylaromatic monomers, conjugated dienes and optionally additional polar vinyl monomers having the required combination of narrow molecular weight distribution (Mw/Mn≦1.20) and relatively low vinyl content (≦18%) of the predominantly poly(conjugated diene) blocks, by anionic polymerization, using the hereinbefore specified α, ω-dilithio initiator solution.

More in particular a process is provided for the preparation of linear block copolymers constituted by monovinylaromatic monomer, conjugated diene and optionally a polar vinyl monomer of the structure ABA, ABCBA, CBC, ACBCA or CABAC respectively, wherein A represents a predominantly poly(monovinylaromatic) block, B represents a predominantly poly(conjugated diene) block and C represents a predominantly poly(polar vinyl) block.

Accordingly the present invention is also relating to a process, comprising the sequential steps of:

(1) charging a predominantly conjugated diene monomer to an α, ω-dilithio initiator in a hydrocarbon solvent-aromatic ether mixture and allowing essentially complete polymerization to occur; and (2) charging a predominantly monovinylaromatic monomer or a predominantly polar vinyl monomer after introduction of an end-capping reagent and addition of ether and allowing essentially complete polymerization to occur; and optionally (3) introducing an end-capping reagent and an ether after polymerization of the monovinylaromatic and charging a predominantly polar vinyl monomer, and allowing essentially complete polymerization. "P With the terms "predominantly conjugated diene", "predominantly conjugated diene" and "predominantly polar vinyl compound" as used throughout this specification, is meant that the indicated monomer may be substantially pure or mixed in a minor degree with a structurally related monomer or with a structurally different monomer and preferably the same comonomer, which occurs in other block segments, i.e. in amounts of less than 15 mol % of the total monomers of said blocks and preferably less than 5 mol %.

Suitable examples of monomer mixtures constituting the blocks A are mixtures of styrene and minor amounts of monomers selected from the group consisting of alpha-methylstyrene, p-vinyltoluene, m-vinyl toluene, o-vinyltoluene, 4-ethylstyrene, 3-ethylstyrene, 2-ethylstyrene, 4-tert.butylstyrene, 2,4-dimethylstyrene, 2 or 4-vinylpyridine butadiene, isoprene, 2-ethyl-1,3-butadiene, 2,3-dimethyl-1,3-butadiene and 1,3-pentadiene or mixtures thereof.

Suitable examples of monomer mixtures constituting block B are mixtures of isoprene or butadiene and minor amounts of monomers selected from styrene, alpha-methylstyrene, p-vinyltoluene, m-vinyltoluene, o-vinyltoluene, 4-ethylstyrene, 3-ethylstyrene, 2-ethylstyrene, 4-tert.butylstyrene, 2,4-dimethylstyrene, butadiene or isoprene, 2-ethyl-1,3-butadiene, 2,3-dimethyl-1,3-butadiene and 1,3-pentadiene or mixtures thereof.

Preferably the constituting monomers of blocks A are mixtures of styrene in a major amount and structurally related monomers as specified hereinbefore in a minor amount and preferably alpha-methylstyrene, while the constituting monomers of block B are selected from butadiene, isoprene and mixtures thereof.

Suitable examples of monomer mixtures constituting optional blocks C are mixtures of a major component selected from lower alkyl ($C_1$-$C_4$) esters of acrylic acid or methacrylic acid such as tert.butylacrylate, tert.butylmethacrylate, methylacrylate, methylmethacrylate, or esters or anhydrides of maleic acid, fumaric acid, itaconic acid, cis-4-cyclohexene-1,2-dicarboxylic acid, endo-cis-bicyclo(2,2,1)-5-heptene-2,3-dicarboxylic acid or mixtures thereof, 2- or 4-vinylpyridine and as a minor component a comonomer selected from styrene, alphamethylstyrene, p-vinyltoluene, m-vinyltoluene, o-vinyltoluene, 4-ethylstyrene, 3-ethylstyrene, 2-ethylstyrene, 4-tert.butylstyrene, 2,4-dimethylstyrene, butadiene or isoprene, 2-ethyl-1,3-butadiene, 2,3-dimethyl-1,3-butadiene and 1,3-pentadiene or mixtures thereof.

Most preferably the blocks A, B and C are constituted by one substantially pure monomer.

It will be appreciated that according to a preferred process embodiment, the main solvent used for initial preparation of α, ω-dilithio initiator and the main solvent used during the actual block copolymer polymerization is the same, although it is not strictly necessary.

A further aspect of the present invention is formed by the block copolymers, obtained by the hereinbefore specified process and characterized by the combination of a narrow molecular weight distribution (Mw/Mn≦1.20) and a relatively low vinyl content of the predominantly poly(conjugated diene)blocks (≦18%). Molecular weights of the linear polymers are determined by GPC and $^1$H NMR and the peak molecular weight, i.e. highest point on the molecular weight distribution, is reported for the examples.

Preferred block copolymers according to the present invention are linear triblock or five block copolymers derived from styrene, butadiene or isoprene and/or a lower alkyl ester of acrylic acid or methacrylic acid, or 2- or 4-vinylpyridine respectively as pure block constituents.

The invention is illustrated by the following examples, however, without any restriction of the scope of it to these specific embodiments.

EXAMPLE 1

Reaction of BuLi with 1,3-diisopropenyl benzene

Procedure A

To a stirred vessel, containing 20 ml of dry cyclohexane were added 1.87 mmoles of s-BuLi (7.2 ml of a 0.26 molar solution in hexanes). To the solution were added 0.93 mmoles of 1,3-diisopropenylbenzene (4.8 ml of a 0.194 molar solution in cyclohexane) at room temperature. Immediately a dark red colour developed and the reaction was continued for 2 hours at 50° C.

Procedure B

To a stirred vessel, containing 200 ml of dry cyclohexane, 0.68 g (6 mmoles) of triethylamine were added. Subsequently, 6 mmoles of s-BuLi (3.2 g of a 12 wt % solution in hexanes) and 0.48 g (3 mmoles) of 1,3-diisopropenylbenzene were added at room temperature. The reaction was continued for 2 hours at room temperature, leading to a dark red solution.

Procedure C

To a stirred vessel, containing 200 ml of dry cyclohexane was added 0.68 g (6 mmoles) of triethylamine. Subsequently, 6 mmoles of t-BuLi (5 ml of a 1.2 molar solution in hexanes) and 0.48 g (3 mmoles) of 1,3-diisopropenylbenzene were added at 0° C. The reaction was continued for 1 hour.

EXAMPLE 2

Preparation of α, ω-dilithiopolybutadiene

Procedure A

To the solution obtained by procedure A of Example 1 1.86 g of butadiene and 5.7 ml (15 vol %) of dry anisole were added at 0° C. The dark red colour rapidly changed to a light orange and the solution becomes pale yellow after stirring overnight. This solution was used as stock for polymerization experiments with a concentration of α, ω-dilithiopolybutadiene (MW=2300) of 0.025 molar.

Procedure B

To the solution obtained by procedure B of Example 1 5.8 g of butadiene and 10 ml (15 vol %) of dry anisole were added at 0° C. The dark red colour rapidly changed to a light orange and becomes pale yellow after stirring overnight. This solution was used as stock for polymerization experiments with a concentration of α, ω-dilithiopolybutadiene (MW=2100) of 0.015 molar.

Procedure C

To the solution obtained by procedure C of Example 1, 5.8 g of butadiene and 10 ml (15 vol %) of dry anisole were added at 0° C. The dark red colour rapidly changed to a light orange and became pale yellow after stirring overnight. This solution was used as stock for polymerization experiments with a concentration of α, ω-dilithiopolybutadiene (MW=2100) of 0.015 molar.

EXAMPLE 3

Synthesis of SBS blockcopolymers with α, ω-dilithiopolybutadiene A.

To a reactor, charged with 1 l of dry cyclohexane, were added a few drops of α, ω-dilithiopolybutadiene A to titrate the solution. Thereafter the reactor was charged with 36 g of butadiene and 24 ml of solution A (containing 0.6 mmol diinitiator) at room temperature. The temperature was allowed to rise to 40° C. and polymerization continued for 10 hours at 40° C. A sample was withdrawn for analysis. The polybutadiene showed the following characteristics: peak MW 70000 g/mol, Mw/Mn=1.10 and a vinyl content of 15%. To the reactor were then added 17 g of styrene and polymerization was continued for 2 hours at 40° C. To the solution was added 1 ml of methanol to terminate the polymerization. The recovered triblock copolymer was stabilized with antioxidant and had the following characteristics: peak MW 102000 g/mol, Mw/Mn=1.15. A sample was subjected to ozonolysis to leave PS with peak MW 15000 g/mol. A compression moulded sample had a Tensile Strength of 16 MPa and an Elongation at break of 1800%.

EXAMPLES 4–6

Following the procedure of Example 3, three other SBS triblock copolymers were prepared with the characteristics as shown in Table I.

TABLE I

| Sample | MW PB | MW PS[a] | $M_w/M_n$ | vinyl % | PS (ozon) |
|---|---|---|---|---|---|
| 4 | 100000 | 13000 | 1.10 | 13 | 14000 |
| 5 | 75000 | 13000 | 1.12 | 15 | 15000 |
| 6 | 70000 | 13000 | 1.15 | 15 | 17000 |

[a]Calculated from GPC and $^1$H NMR, assuming a triblock structure.

EXAMPLE 7

Synthesis of SBS blockcopolymers with α, ω-dilithiopolybutadiene B

To a polymerization bottle, charged with 250 ml of dry cyclohexane, a few drops of α, ω-dilithiopolybutadiene B were added to titrate the solution. Thereafter the bottle was charged with 12 g of butadiene and 11 ml of solution B (containing 0.17 mmol diinitator) at room temperature. The temperature was allowed to rise to 60° C. and polymerization continued for 2 hours at 60° C. A sample was withdrawn for analysis. The polybutadiene showed the following characteristics: peak MW 83000 g/mol, Mw/Mn=1.10 and a vinyl content of 11%. To the bottle were then added 6 g of styrene and polymerization was continued for 30 min at 60° C. To the solution was added 17 ml of methanol to terminate the polymerization. The recovered triblock copolymer was stabilized with antioxidant and had the following characteristics: peak MW 115000 g/mol, Mw/Mn=1.18. A sample was subjected to ozonolysis to leave PS with peak MW 18000 g/mol. A compression moulded sample had a Tensile Strength of 13 MPA and an Elongation at break of 1800%.

EXAMPLE 8

Following the procedure of Example 7, another SBS triblock copolymer was prepared with the following characteristics: peak MW PB 82000 g/mol, $M_w/M_n$=1.12 and a vinyl content of 11%; peak MW SBS 116000, $M_w/M_n$=1.19. MW PS after ozonolysis 17000. Tensile Strength 17 MPA. Elongation at break 1900.

EXAMPLE 9

Synthesis of SBS blockcopolymers with α, ω-dilithiopolybutadiene C

To a reactor, charged with 1 l of dry cyclohexane, a few drops of α, ω-dilithiopolybutadiene C were added to titrate the solution. Thereafter the reactor was charged with 36 g of butadiene and 40 ml of solution C (containing 0.6 mmol diinitiator) at room temperature. The temperature was allowed to rise to 40° C. and polymerization continued for 10 hours at 40° C. A sample was withdrawn for analysis. The polybutadiene had the following characteristics: peak MW 70000 g/mol, Mw/Mn=1.15 and a vinyl content of 16%. To the reactor were then added 14 g of styrene and polymerization was continued for 2 hours at 40° C. To the solution was added 1 ml of methanol to terminate the polymerization. The recovered triblock copolymer was stabilized with antioxidant and had the following characteristics: peak MW96000 g/mol, Mw/Mn=1.20. A sample was subjected to ozonolysis to leave PS with peak MW 14000 g/mol. A compression moulded sample had a Tensile Strength of 15 MPA and an Elongation at break of 1400%.

EXAMPLES 10-11

Following the procedure: of Example 9, two other SBS triblock copolymers were prepared with the characteristics as shown in Table II.

TABLE II

| Sample | MW PB | MS PS[a] | $M_w/M_n$ | vinyl % | Tensile (MPa) | Elong. (%) | PS (ozon) |
|---|---|---|---|---|---|---|---|
| 10 | 65000 | 13000 | 1.25 | 16 | 22.5 | 1400 | 14000 |
| 11 | 80000 | 18000 | 1.15 | 18 | 17.5 | 1400 | 20000 |

[a]Calculated from GPC and $^1$H NMR, assuming a triblock structure.

EXAMPLES 12-14

Synthesis of PMMA-SBS-PMMA and PTBMA-SBS-PTBMA block copolymers with α, ω-dilithiopolybutadiene A A solution of living Li-SBS-Li triblock copolymer was prepared using the procedure of Example 3, after completion of the styrene polymerization, 12 ml of a 0.5 molar of diphenylethylene solution in cyclohexane were added. The endcapping reaction was continued for 30 min at room temperature. Then the red solution is cooled to 0° C. and 1 l of dry tetrahydrofuran is added and the solution cooled to −78° C. At this temperature 2.4 g of methyl methacrylate or tertiary butyl methacrylate were introduced giving a clear colourless solution. The polymerization was continued for 30 min and then 1 ml of methanol was introduced to terminate the polymerization. The recovered polymers were stabilized with antioxidant and showed the characteristics as shown in Table III.

TABLE III

| Sample | PB | vinyl % | PS[a] | PMMA[a] PTBMA | $M_w/M_n$ | Tensile MPA | Elongation (%) |
|---|---|---|---|---|---|---|---|
| 12[b] | 69000 | 16 | 12000 | 2000 | 1.16 | 17.8 | 1500 |
| 13[b] | 79000 | 15 | 14000 | 3000 | 1.12 | 19.5 | 1800 |
| 14[c] | 120000 | 14 | 21000 | 4000 | 1.17 | 21.8 | 1700 |

[a]Calculated from GPC and $^1$H NMR, assuming a tri-/fiveblock structure.
[b]With methyl methacrylate.
[c]With tertiary butyl methacrylate.

EXAMPLES 15-16

Synthesis of PMMA-SBS-PMMA and PTBMA-SBS-PTBMA block copolymers with α, ω-dilithiopolybutadiene C Following the Same procedure as described in Examples 12–14 a PMMA-SBS-PMMA and a PTBMA-SBS-PTBMA block copolymers were synthesized with α, ω-dilithiopolybutadiene C. The characteristics are shown in Table IV.

TABLE IV

| Sample | PB | vinyl % | PS[a] | PMMA[a] PTBMA | $M_w/M_n$ | Tensile MPA | Elongation (%) |
|---|---|---|---|---|---|---|---|
| 15[b] | 70000 | 16 | 11000 | 4000 | 1.15 | 25 | 1400 |
| 16[c] | 70000 | 16 | 11000 | 4000 | 1.15 | 22 | 1400 |

[a]Calculated from GPC and $^1$H NMR, assuming a tri-/fiveblock structure.
[b]With methyl methacrylate.
[c]With tertiary butyl methacrylate.

EXAMPLES 17–18

Synthesis of PMMA-B-PMMA block copolymers with α, ω-dilithiopolybutadiene C

Following the same procedure as described in Examples 12–14 two PMMA-B-PMMA block copolymers were synthesized with α, ω-dilithiopolybutadiene C. The characteristics are shown in Table V.

TABLE V

| Sample | PB | vinyl % | PMMA[a] | PMMA (ozon) | $M_w/M_n$ | Tensile (MPa) | Elongation (%) |
|---|---|---|---|---|---|---|---|
| 17 | 85000 | 16 | 25000 | 28000 | 1.20 | 19 | 1000 |
| 18 | 75000 | 17 | 22000 | 23000 | 1.20 | 19 | 1000 |

[a]Calculated from GPC and $^1$H NMR, assuming a triblock structure.

COMPARATIVE EXAMPLES 19–20

Inefficiency of the s-BuLi/1,3-DIB adduct

The adduct of s-BuLi and 1,3-diisopropenylbenzene was prepared following the procedure A of Example 1. With the resulting solution, several polymerizations have been carried out as shown in Table VI.

TABLE VI

| Sample | MW PB | MW PS[a] | $M_w/M_n$ | Tensile (MPA) | Elong. (%) | PS (ozon) |
|---|---|---|---|---|---|---|
| 19 | 10000 | 18000 | 1.30 | too weak | — | 40000 |
| 20 | 20000 | 18000 | 1.30 | too weak | — | 40000 |
| 21 | 55000 | 25000 | 1.25 | too weak | — | 45000 |
| 22 | 70000 | 13000 | 1.20 | 0.6 | 200 | 30000 |

[a]Calculated from GPC and $^1$H NMR, assuming a triblock structure.

COMPARATIVE EXAMPLES 23–26

The inefficiency of the sBuLi/1,3-DIB adduct in the presence of triethylamine

The adduct of s-BuLi and 1,3-diisopropenylbenzene was prepared following the procedure A of Example 1, with the modification that different amounts of triethylamine have been added. With the resulting solutions, several polymerizations have been carried out as shown in Table VII.

TABLE VII

| Sample | Ratio EtN$_3$/Li | MW PB | MW PS[a] | $M_w/M_n$ | Vinyl (%) | Tensile (MPA) | Elong (%) | PS (ozon) |
|---|---|---|---|---|---|---|---|---|
| 23 | 0.1 | 70000 | 13000 | 1.20 | 15.5 | 0.9 | 60 | 31000 |
| 24 | 1.0 | 85000 | 12000 | 1.20 | 15.5 | 1.1 | 100 | 25000 |
| 25 | 3.0 | 95000 | 15000 | 1.25 | 16.5 | 1.0 | 90 | 30000 |
| 26 | 10.0 | 95000 | 16000 | 1.20 | 16.5 | 1.5 | 50 | 30000 |

[a]Calculated from GPC and $^1$H NMR, assuming a triblock structure.
*The modified procedures were according to the hereinbefore referred Kamienski and Foss publications, e.g. U.S. Pat. No. 3,903,168.

COMPARATIVE EXAMPLES 27–31

Polymerizations with α, ω-dilithiopolybutadiene in the presence of polar additives An α, ω-dilithiopolybutadiene was prepared following the procedure B of Example 2, with the modification that other polar additives than anisole are added. With the resulting solutions, several polymerizations have been carried out as shown in Table VIII.

TABLE VIII

| Sample | Additive (vol %) | MW PB | MW PS[a] | $M_w/M_n$ | Vinyl (%) | Tensile (MPa) | Elong (%) | PS (ozon) |
|---|---|---|---|---|---|---|---|---|
| 27 | Et₃N (12) | 86000 | 22000 | 1.19[b] | 15.0 | | | 29000 |
| 28 | Et₂O (15) | 77000 | 15500 | 1.28[b] | 18.0 | | | 16000 |
| 29 | MTBE(10) | 75000 | 14000 | 1.34 | 16.0 | 2.5 | 700 | |
| 30* | MTBE(15) | 82000 | 13000 | 1.20 | 33.0 | 21.8 | 1700 | 14000 |
| 31* | TMEDA[c] | 77000 | 18000 | 1.15 | 39.0 | | | 19500 |

[a]Calculated from GPC and ¹H NMR, assuming a triblock structure.
[b]Bimodal distribution.
[c]Ratio TMEDA/Li = 0.34.
*It will be appreciated that in these samples the vinyl content was too high.

We claim:

1. A process for the preparation of an efficient industrial organolithium diinitiator, comprising the steps of:

reacting two mole equivalents of a mono-organolithium initiator with one mole equivalent 1,3-diisopropenyl benzene at a temperature in the range of from −20° C. to 60° C. in an apolar hydrocarbon solvent, optionally in the presence of a tertiary amine, to form a diinitiator; and reacting the diinitiator with a small amount of conjugated diene monomer and at least 15 vol % of an aromatic ether activator relative to the total solvent volume, at a temperature in the range of from 0° to 30° C., to form a solution of an α, ω-dilithio poly(conjugated diene) initiator having a peak molecular weight in the range of from 1000 to 3000.

2. The process according to claim 1, wherein the mono-organolithium initiator is sec-butyllithium.

3. The process according to claim 1, wherein the reaction temperature during the reaction of 1,3-diisopropylbenzene with the monoorganolithium initiator is in the range of from 10° to 30° C.

4. The process according to claim 1, wherein the apolar hydrocarbon solvent is a cycloalkane having from 5 to 8 carbon atoms.

5. The process according to claim 1, wherein the aromatic ether activator is anisole, diphenylether, or derivatives thereof wherein at least one phenyl ring has been substituted by one or more alkyl groups or alkoxy groups containing from 1 to 3 carbon atoms.

6. The process according to claim 1, wherein the amount of the aromatic ether activator to be applied in the reaction medium is in the range of from 15 to 40 vol %.

7. The process according to claim 6, wherein the amount of the aromatic ether activator is in the range of from 15 to 25 vol %.

8. The process according to claim 1, wherein the conjugated diene is butadiene or isoprene.

9. The process according to claim 1, wherein the peak molecular weight of the prepared α, ω-dilithio initiator is in the range of from 1000 to 2800.

10. The process according to claim 9, wherein the peak molecular weight of the initiator is in the range of from 1500 to 2300.

11. A process for the preparation of symmetrical block copolymers, comprising the steps of:

reacting two mole equivalents of a mono-organolithium initiator with one mole equivalent 1,3-diisopropenyl benzene at a temperature in the range of from −20° C. to 60° C. in an apolar hydrocarbon solvent, optionally in the presence of a tertiary amine, to form a diinitiator;

reacting the diinitiator with a small amount of conjugated diene monomer and at least 15 vol % of an aromatic ether activator relative to the total solvent volume, at a temperature in the range of from 0° to 30° C., to form a solution of an α, ω-dilithio poly(conjugated diene) initiator having a peak molecular weight in the range of from 1000 to 3000; and polymerizing blocks of monovinyl aromatic monomers, conjugated dienes, and optionally polar vinyl monomers with the solution of an α, ω-dilithio poly(conjugated diene) initiator to make linear symmetric polymers having a molecular weight distribution (Mw/Mn)≦1.20 and having a vinyl content≦18% for the polymerized conjugated diene blocks.

12. The process according to claim 11, wherein the linear symmetric polymers have the structure ABA, ABCBA, CBC, ACBCA, or CABAC wherein A represents blocks of the vinyl aromatic monomers, B represents blocks of the conjugated dienes, and C represents blocks of the polar vinyl monomers.

13. The process according to claim 12, wherein the vinyl aromatic monomer is styrene, optionally mixed with α-methylstyrene.

14. The process according to claim 12, wherein the conjugated diene monomer is butadiene, isoprene, or mixtures thereof.

15. The process according to claim 12, wherein the polar vinyl monomer is a lower alkyl ester of acrylic acid or methacrylic acid, an ester or anhydride of maleic acid, fumaric acid, itaconic acid, cis-4-cyclohexene-1,2-dicarboxylic acid, endo-cis-bicyclo(2,2,1)-5-heptene-2,3-dicarboxylic acid, 2-vinylpyridine, 4-vinylpyridine, or mixtures thereof.

* * * * *